US008620264B2

(12) United States Patent  
Hicks

(10) Patent No.: US 8,620,264 B2  
(45) Date of Patent: Dec. 31, 2013

(54) APPARATUS AND METHOD FOR SHARING AND ASSIGNING MULTIPLE NUMBERS TO A COMMUNICATION DEVICE

(75) Inventor: Mary Anne Hicks, Garland, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1626 days.

(21) Appl. No.: 11/846,695

(22) Filed: Aug. 29, 2007

(65) Prior Publication Data

US 2009/0061872 A1 Mar. 5, 2009

(51) Int. Cl.
*H04M 11/00* (2006.01)
(52) U.S. Cl.
USPC ........... 455/407; 455/405; 455/406; 455/408; 379/114.22; 379/114.26; 379/114.28
(58) Field of Classification Search
USPC ............. 455/405, 406, 407, 408; 379/114.22, 379/114.26, 114.28
See application file for complete search history.

(56) References Cited

U.S. PATENT DOCUMENTS

| | | | |
|---|---|---|---|
| 6,526,272 B1 | 2/2003 | Bansal | |
| 6,758,244 B2 | 7/2004 | Workman | |
| 7,333,796 B2 * | 2/2008 | Scalisi et al. | 455/406 |
| 2003/0119479 A1 * | 6/2003 | Arima et al. | 455/408 |
| 2003/0156700 A1 * | 8/2003 | Brown et al. | 379/210.02 |
| 2006/0234693 A1 | 10/2006 | Isidore | |
| 2006/0264208 A1 * | 11/2006 | Moon et al. | 455/417 |
| 2006/0286973 A1 * | 12/2006 | Smith et al. | 455/417 |
| 2007/0135109 A1 * | 6/2007 | Walter et al. | 455/415 |
| 2007/0260685 A1 * | 11/2007 | Surazski | 709/204 |
| 2008/0132201 A1 * | 6/2008 | Karlberg | 455/407 |

* cited by examiner

*Primary Examiner* — Justin Lee
(74) *Attorney, Agent, or Firm* — Guntin & Gust, PLC; Douglas Schnabel

(57) ABSTRACT

A system that incorporates teachings of the present disclosure may include, for example, a communication device having a controller to associate two or more phone numbers with two or more phone bills, where the controller is adapted to send outgoing phone calls and receive incoming phone calls on multiple telephone numbers assigned to the mobile communication device in accordance with at least one user profile. Other embodiments are disclosed.

12 Claims, 7 Drawing Sheets

APPARATUS AND METHOD FOR SHARING AND ASSIGNING MULTIPLE NUMBERS TO A COMMUNICATION DEVICE

FIELD OF THE DISCLOSURE

The present disclosure relates generally to communication systems and more specifically to an apparatus and method for sharing and assigning multiple numbers to a communication device.

BACKGROUND

Today, many people carry more than one communication device. For example, a person may carry a cell phone for personal calls and a second cell phone for business calls. Each cell phone can have a corresponding phone number. Each phone number is also generally associated with a separate billing account. The user must usually decide which phone to use when placing a call, given that the two devices may be billed separately at different rates. Moreover, a user carrying two mobile devices will generally receive bills for both devices.

The user may also need to occasionally share a mobile device with other users, for example, with family members in a household. One phone account is generally billed for the calls made on the mobile device regardless of who uses it. Although the users can review the bill to itemize calls placed by the users, this requires action on the user's part. Moreover, each user may need to identify the calls they placed. Furthermore, the phone may not provide separate billing or service plans for calls placed to family, friends, or business associates.

DETAILED DESCRIPTION

In one embodiment of the present disclosure, a media server can include a controller to assign multiple phone numbers and route calls to a shared communication device in accordance with a user profile. The controller can bill accounts of the user profile separately for charges associated with use of the multiple phone numbers.

In a second embodiment of the present disclosure, a mobile communication device can have a controller to associate two or more phone numbers with two or more phone bills. The controller is adapted to send outgoing phone calls and receive incoming phone calls on multiple telephone numbers assigned to the mobile communication device in accordance with at least one user profile.

In a third embodiment of the present disclosure, a method can involve storing at least two user profiles associated with a communication device, activating an account associated with one user profile responsive to a selection of the one user profile from the two user profiles, and providing services to the communication device in accordance with the selected user profile. Each user profile can include a phone number and/or an instant message identifier.

Figure 1:
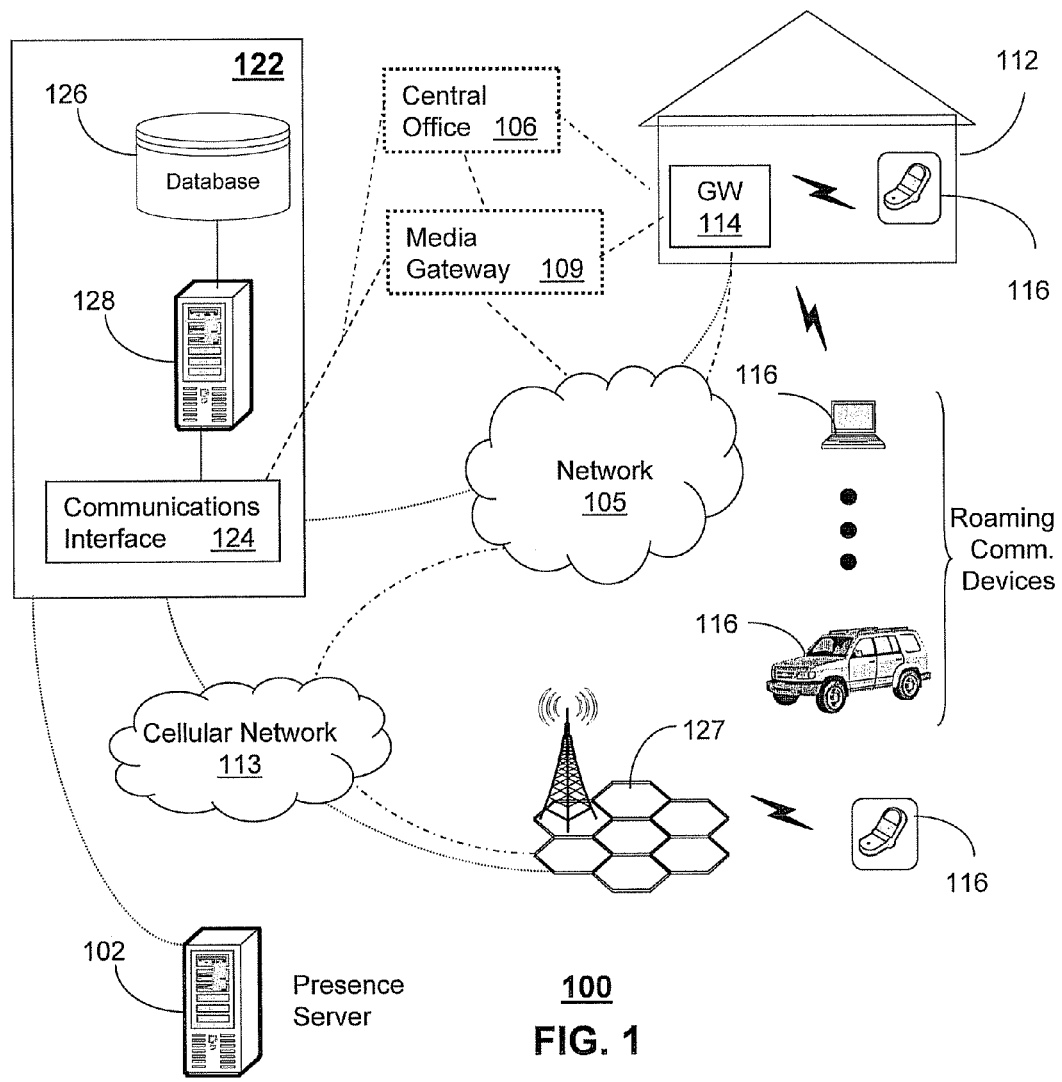
FIGS. 1-3 depict exemplary embodiments of a communication system.

FIG. 1 depicts an exemplary embodiment of a communication system 100 employing fixed and/or mobile communication devices 116 communicating by way of wired infrastructure with other communication devices and/or wireless access points (WAPs) and/or a network proxy or web server 122, which collectively operate in the communication system 100.

The communication device 116 can be a multimode communication device, such as a multimode VoIP terminal, cell phone, or any other mobile communication device. The present disclosure also contemplates the use of other types of communication devices, including other types of voice, video and data devices. The communication system 100 can comprise an Internet-Protocol (IP) network 105. The IP network can be an Internet Service Provider (ISP) network 105. The network 105 can be coupled to the network proxy 122, the cellular network 113 and network elements located in one or more of the buildings 112 representing an enterprise or residence. The ISP network 105 utilizes technology for transporting Internet traffic.

A presence system 102 can be utilized to track the whereabouts and status of a party communicating with one or more communication devices 116 in the communications system 100. Presence information derived from a presence system 102 can include a location of a party utilizing a communication device 116, the type of device used by the party (e.g., cell phone, PDA, home phone, home computer, etc.), and/or a status of the party (e.g., busy, offline, actively on a call, actively engaged in instant messaging, etc.). The presence system 102 can perform the operations for parties who are subscribed to services of the presence system 102.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over an IP network 105, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
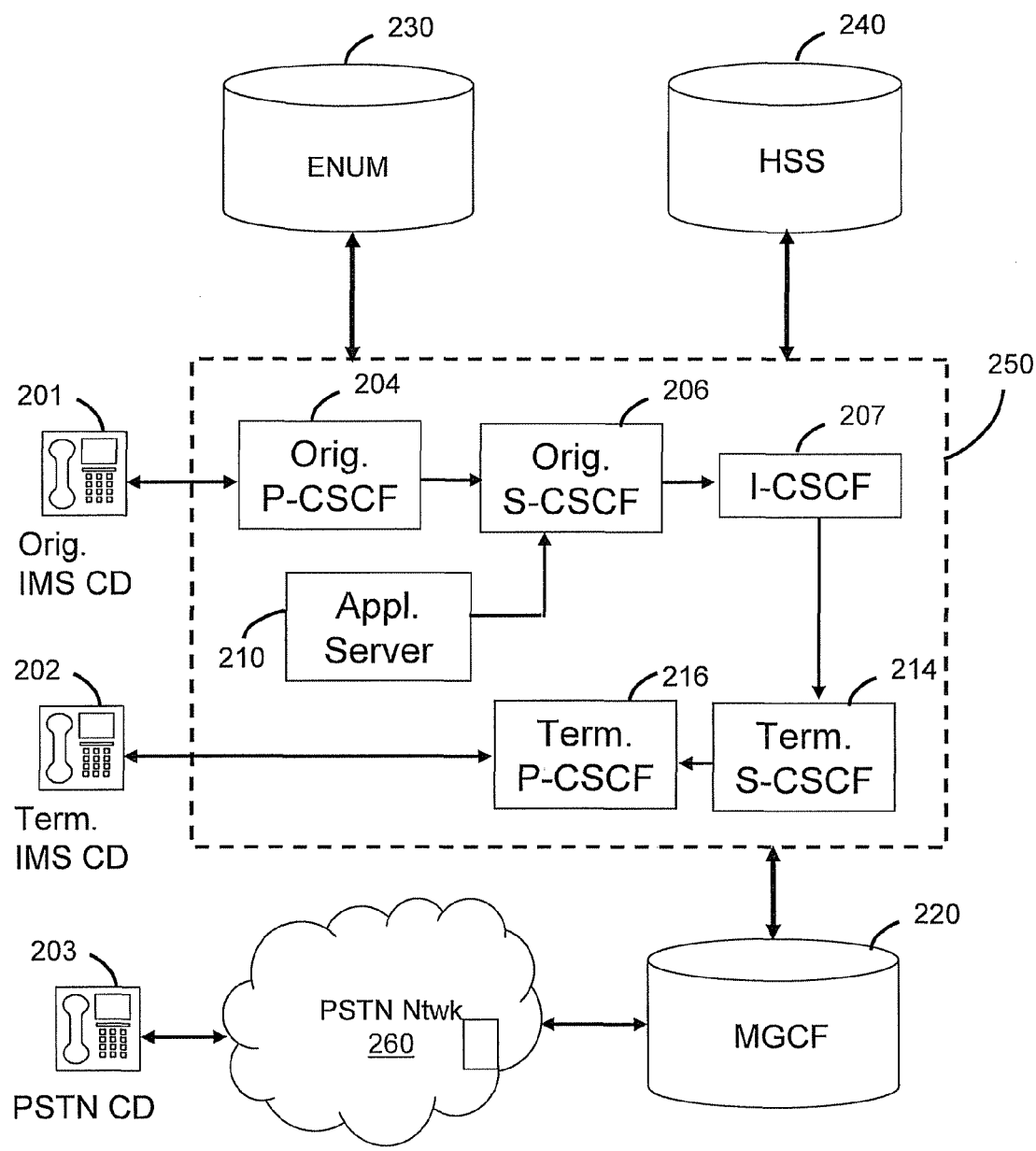

FIG. 2 depicts an exemplary embodiment of a communication system 200 employing a IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating EMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
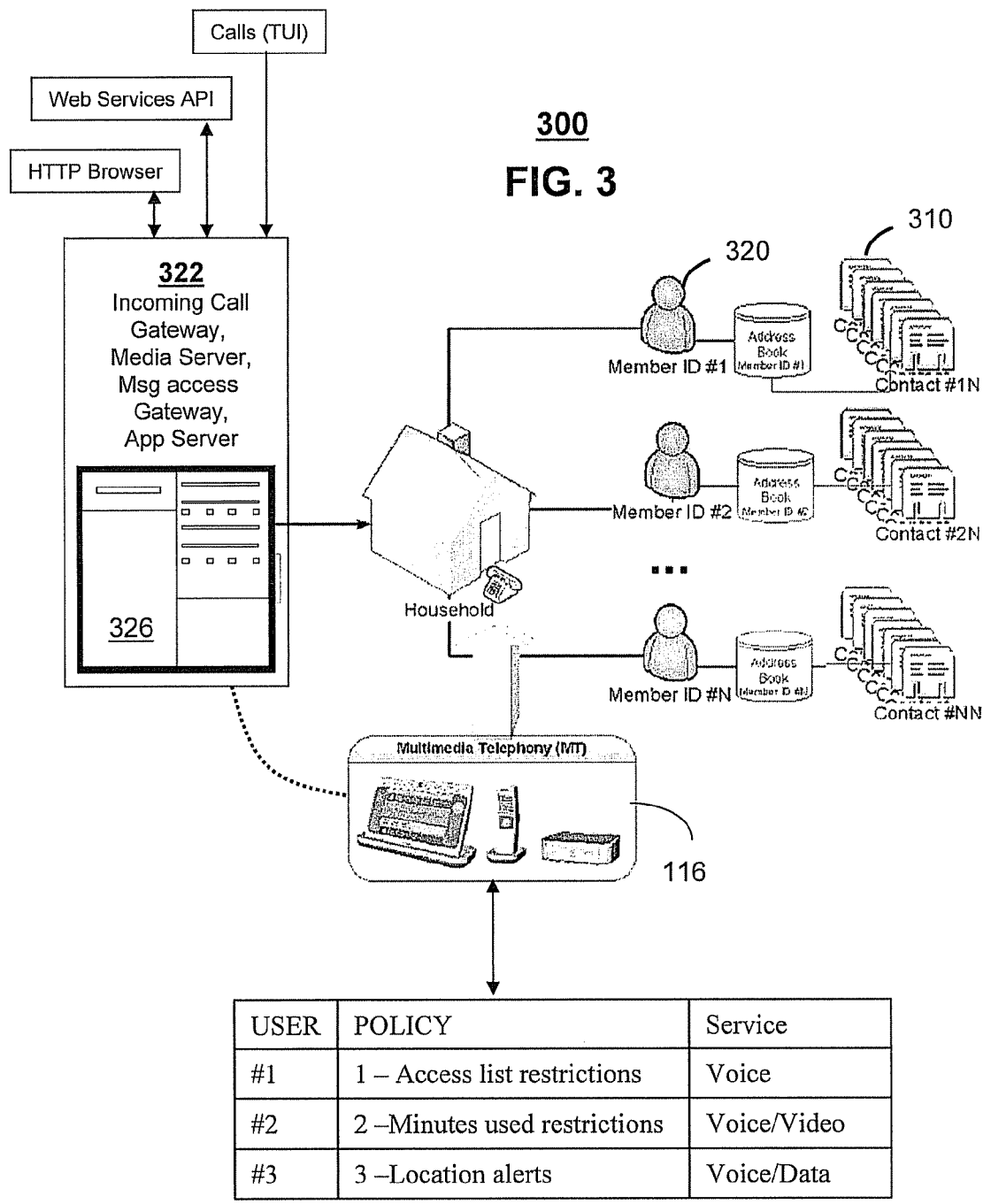

FIG. 3 depicts an exemplary embodiment of a communication system 300 employing fixed and/or mobile communication devices 116 communicating by way of wireless access points (WAPs) and/or wired infrastructure with other communication devices and/or a media server 322, which collectively operate in the communication system 300. Communication system 300 can be overlaid or operably coupled with communication systems 100, and/or as another representative embodiment of the communication system.

The communication system 300 illustrates an exemplary multi-user environment for sharing one or more communication devices 116. Each user can have a corresponding contact information 310, such as an address book, phone number, instant message identifier, personal profile, or other personal contact information. Users in the communication system 300 can select operations according to one or more telephony usage profiles 320 assigned to each user sharing the terminal device in a multi-user environment as shown in FIG. 3.

Media server 322 can include various components and can utilize various protocols to communicate with a storage area network 326, as well as to communicate with the one or more other communication devices 116, such as for distributing notifications and user profiles. The media server 322 can include components and technology for directing calls to an intended recipient and billing charges to a user account, such as according to preferences of a targeted recipient. The storage area network 326 can include various components and can utilize various protocols to store data related to users of the communication system 300. For example, the storage area network 326 can store one or more user profiles 320, containing various information including subscription information, business telephone numbers, personal telephone numbers, messenger identifiers, and billing account information. The storage area network 326 can also include one or more user profiles that can store various information including user preferences, targeted recipients, recipient preferences, and other information. Calls and/or messages can be delivered directly to the communication devices 116 from the media server 322 as represented by the dashed lines.

Figure 4:
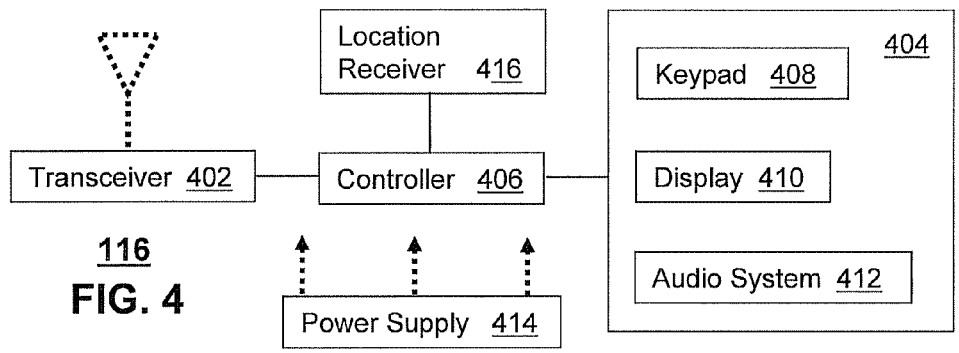
FIG. 4 depicts an exemplary embodiment of a mobile communication device.

FIG. 4 depicts an exemplary embodiment of the communication device 116. The communication device 116 can comprise a wired and/or wireless transceiver 402, a user interface (UI) 404, a power supply 414, a location receiver 416, and a controller 406 for managing operations thereof. In an embodiment where the communication device 116 operates in a landline environment, the transceiver 402 can utilize common wireline access technology to support POTS or VoIP services.

In a wireless communications setting, the transceiver 402 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing a public or private communication spectrum according to any number of communication protocols that can be dynamically downloaded over-the-air to the terminal device. It should be noted also that next generation wireless access technologies can be applied to the present disclosure.

The UI 404 can include a keypad 408 with depressible or touch sensitive navigation disk and keys for manipulating operations of the communication device 116. The UI 404 can further include a display 410 such as monochrome or color LCD (Liquid Crystal Display) for conveying images to the end user of the terminal device, and an audio system 412 that utilizes common audio technology for conveying and intercepting audible signals of the end user.

The power supply 414 can utilize common power management technologies such as replaceable batteries, supply regulation technologies, and charging system technologies for supplying energy to the components of the terminal device and to facilitate portable applications. In stationary applications, the power supply 414 can be modified so as to extract energy from a common wall outlet and thereby supply DC power to the components of the communication device 116.

The location receiver 416 can utilize common technology such as a common GPS (Global Positioning System) receiver that can intercept satellite signals and therefrom determine a location fix of the communication device 116.

The controller 406 can utilize computing technologies such as a microprocessor and/or digital signal processor (DSP) with associated storage memory such a Flash, ROM, RAM, SRAM, DRAM or other like technologies for controlling operations of the aforementioned components of the terminal device.

Figure 5:
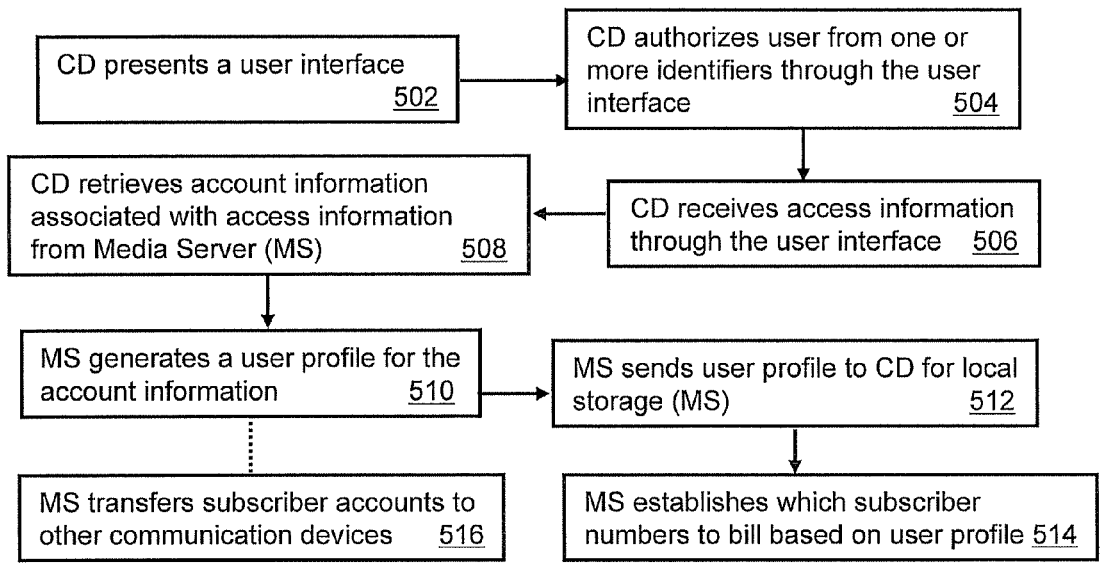
FIGS. 5-8 depict exemplary flow diagrams corresponding to methods operating in portions of the communication systems.

FIG. 5 depicts an exemplary method 500 operating in portions of the communication systems 100-300. Briefly, method 500 is directed to user account set-up for sharing a communication device 116. It would be apparent to an artisan with ordinary skill in the art that other embodiments not depicted in FIG. 5 are possible without departing from the scope of the claims described below. For convenience, the term communication system 100 as used in the following paragraphs can mean communication systems 100, 200, and 300 singly or in combination.

Method 500 begins with step 502 in which the communication device 116 can present a user interface, such as a graphical user interface (GUI) on the display 410. The GUI can additionally operate in conjunction with a biometric device, such as a finger print scanner, a voice identification program, or any other biometric sensing device. A user operating the communication device 116 can submit one or more identifiers, such as a finger print, a spoken utterance pass-phrase, a sequence of input keys, and/or an user code. At step 504, the communication device can authorize the user from the one or more identifiers. The communication device 116 can then proceed to receive access information, such as an access code, from the user through the user interface at step 506. The access code can take various forms, such as a log-in password, a pass-phrase, a phone number, a personal identifier, an account number, or any other user input that further identifies services to which the user currently subscribes, or desires to subscribe. As an example, the user can enter a business telephone number associated with a first account, and/or a personal telephone number associated with a second account.

At step 508, the communication device 116 can retrieve account information associated with access information from the media server 322. Account information can include billing information, address information, calling number history, multiple telephone numbers, messaging information or other information associated with a user or the user's account. The media server 322 can then proceed to generate a user profile based on the provided access information as shown in step 510. For example, referring back to FIG. 3, a user can associate multiple telephone numbers under different accounts to the user profile. The media server 322 can then refer to the user profile 320 to direct calls to the user. The media server 322 can also transfer subscriber account information or user profiles 320 to the other communication devices 116 depending on who is using the communication device.

Returning back to FIG. 5, at step 512, the media server 322 can send the user profile to the communication device 116 for local storage. Notably, the communication device 116 can store multiple user profiles for different users to allow different users to share the communication device 116. The user profiles allow the user to receive their specific subscription service on the shared communication device 116. At step 514, the media server 322 can establish which subscriber numbers to bill for incoming or outgoing calls based on user profile. The user profile can maintain separate account information such as a business account and a personal account. The user profile can also keep track of the minutes used, the billing associated with each minute, and indicate when an account exceeds its allocated minutes. The media server 322 can access the user profile and propose which account to charge based on the minutes used, the plan, and the other accounts available to the user. The media server 322 can also determine which services are available to the user based on the user profile. As an example, the media server 322 can set parental controls on multiple accounts on the same phone, limit minutes used per account, limit who each subscriber can talk to, and alert administrators, such as a parent, when a policy has been violated or tampered with.

In one embodiment, the media server 322 can transfer subscriber account information to other communication devices, as in step 516. This allows the user to access their subscriber account information on another device such as a personal computer (PC). A user interface on the PC can present the minutes billed to separate accounts, such as a business account or personal account. The user interface, also allows the user to correct billing charges for accidentally tagged calls. For example, if the user, or the communication device 116 incorrectly identified a call as a business call, and charged the user's business account, the user can manually adjust the account to which the call was billed via the user interface. Alternatively, the media server 322 can automatically adjust billing charges upon receiving a user directive.

Figure 6:
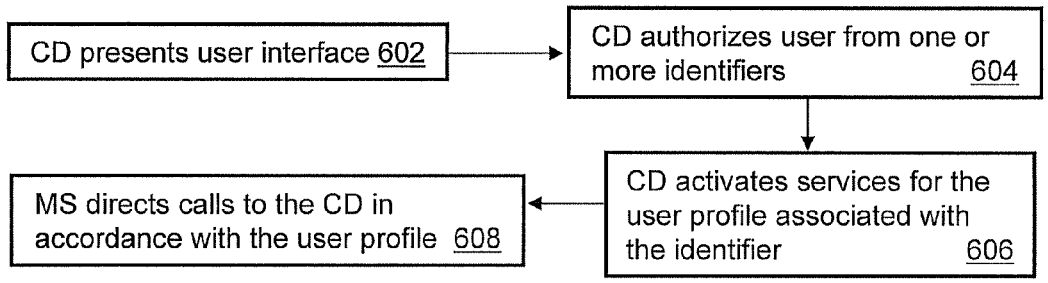

FIG. 6 depicts an exemplary method 600 operating in portions of the communication systems 100-300. Briefly, method 600 is directed to sharing a communication device 116 that has been set-up for multiple accounts, for example, in accordance with method 500. The method 600 can start in a state, for example, wherein no users are currently operating the communication device 116.

At step 602, the communication device can present a user interface. The user interface can present a default configuration, such as a log-in screen, when the phone is not in use. The user can enter in a log-in username and/or password to access their account and receive their service on the shared communication device 116. The present disclosure contemplates using other access techniques, such as the user submitting a biometric identifier, including a finger print or spoken passphrase. If however another user has already logged into the communication device 116, but is not using the communication device 116, a different log-in screen can be presented, allowing another user to log-in, such as a temporary log-in.

At step 604, the communication device 116 authorizes the user from the one or more identifiers submitted to the user interface. In one arrangement, the communication device 116 can authenticate the user locally, for example, on the communication device. As one example, the physical location of the device can be verified for authenticating the user's identification at the premise 112. In another arrangement, the communication device 116 can send the identifier to the media server 322 to authenticate the user. At step 606, the communication device 116 can activate services for the user profile associated with the one or more identifiers. The communication device 116, upon log-in, can initially present to the user a list of phone numbers directed to the communication device 116 based on the user profile. For example, the user profile which was previously generated by the user, can identify multiple telephone numbers which are to be associated with the shared communication device 116. This allows the user to see what accounts are set-up and available for use on the shared communication device 116. At step 608, the media server 322 can direct a call to the communication device 116 in accordance with the user profile at step 608. The media server 322 can also communicate with account providers for each of the different accounts to separately bill services associated with the each of the telephone numbers.

Figure 7:
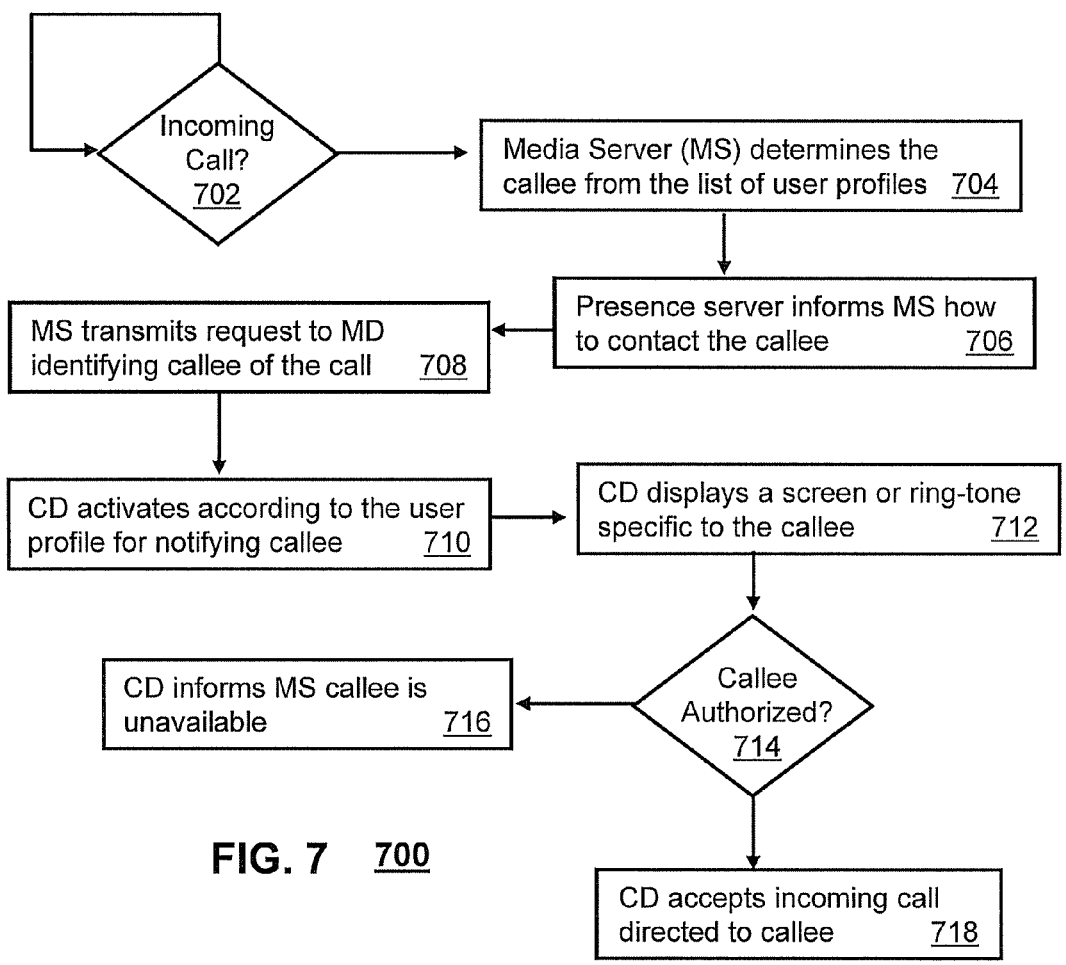

FIG. 7 depicts an exemplary method 7 operating in portions of the communication systems 100-300. Briefly, method 700 is directed to managing incoming calls of a shared communication device 116. It would be apparent to an artisan with ordinary skill in the art that other embodiments not depicted in FIG. 7 are possible without departing from the scope of the claims described below. For convenience, the term communication system 100 as used in the following paragraphs can mean communication systems 100, 200 and 300 singly or in combination, and the term communication device 116 can mean communication devices 201, 202, 203 and 116 singly or in combination.

At step 702 an incoming call placed by a caller and directed to a callee at step 702 can be received. At step 704, the media server 322 can determine the callee from the list of user profiles. For example, the media server 322 can identify to whom the call is directed by evaluating the user profiles associated with the shared communication device. Recall, each user profile can provide a list of telephone numbers to associate with a user; that is, the callee in this example. At step 706, the presence server 102 (See FIG. 1) can determine how to contact the callee, and the most appropriate manner for reaching the callee. For example, the presence server 102 can determine a current location of callee, and determine which communication device 116 is available to the user (e.g. cell phone, IPTV, portable music player, headset, laptop) and/or possible applications for communicating with the callee based on their expressed availability (e.g. messenger, video, voice). The presence server 102 can provide the media server 322 with the contact information.

In response, at step 708, the media server 322 can transmit a request to the communication device 116 identifying the callee of the call. The request can be transmitted by a circuit switched and/or packet switched connection prior to connecting the call for accepting the call. During the request period, in one arrangement, the media server 322 can temporarily accept the connection and present an audible message to the caller that the callee is being requested. For example, the media server 322 can state to the caller that the callee is being located on their cell phone, or home phone. At step 710, communication device 116 activates to notify the callee according to the determined user profile. For instance, as shown in step 712, the communication device 116 can display a custom screen or ring-tone specific to the callee. The screen and/or ring-tone can be specific to each user sharing the communication device 116, and can allow users to audibly or visually distinguish to whom the incoming call is directed.

At step 714, the callee can be authorized. A user that responds to the call can be prompted for one or more identifiers to authenticate that he or she is the intended recipient of the call. For example, the communication device 116 can present a user interface to which the callee must respond to accept the call. This can prevent other users sharing the communication device 116 from accepting a call that is not directed to them. For example, the communication device 116 can present a log-in screen specific to the callee, to which the callee responds for accepting the call. If the callee is not authorized, the communication device 116 can inform the media server 322 that the callee is unavailable, and to either disconnect or reject the incoming call, as in step 716. Upon authorizing the callee, the communication device 116 can inform the media server 322 to accept and/or connect the call, as in step 718.

Figure 8:
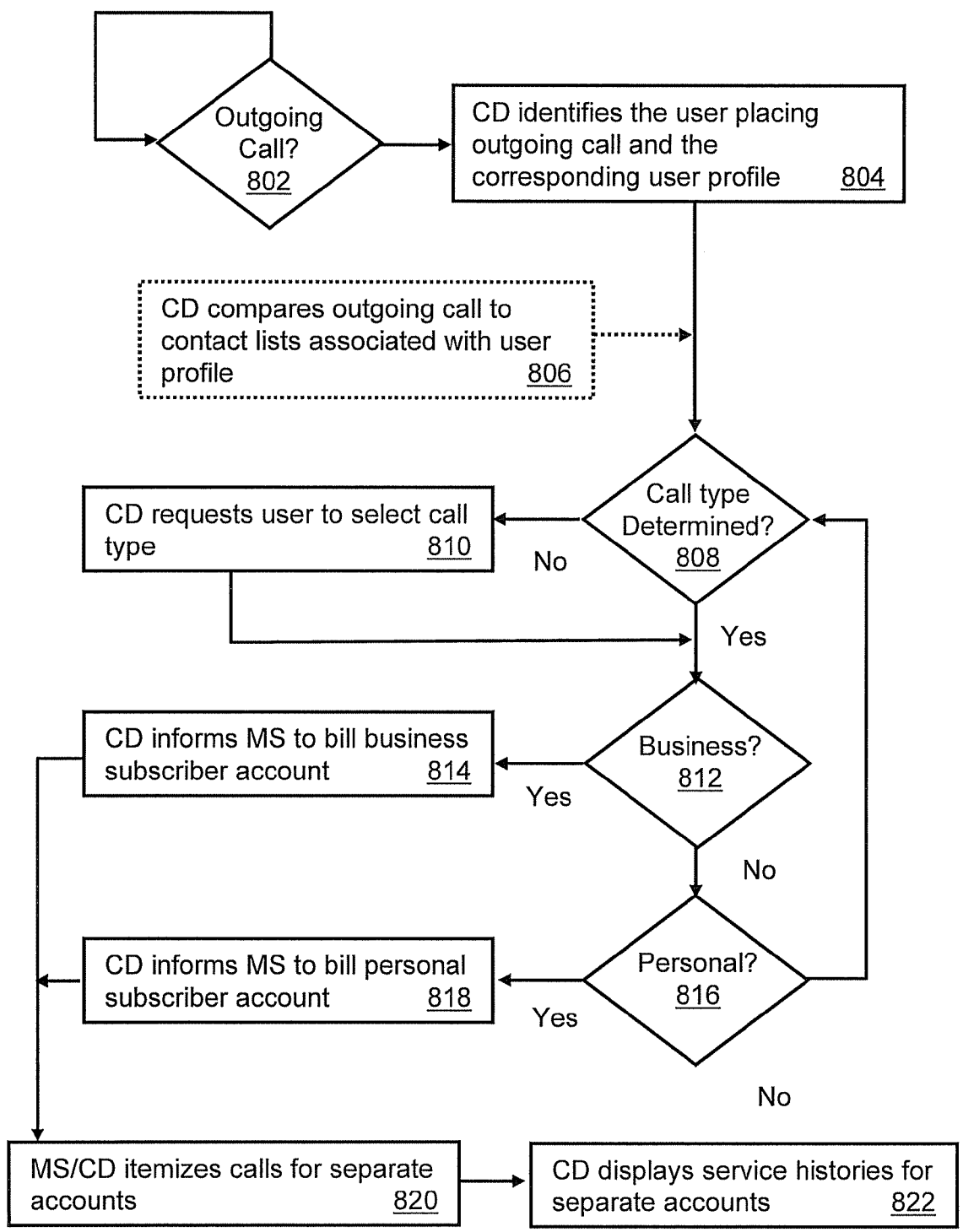

FIG. 8 depicts an exemplary method 800 operating in portions of the communication systems 100-300. Briefly, method 800 is directed to managing outgoing calls of a shared communication device 116. It would be apparent to an artisan with ordinary skill in the art that other embodiments not depicted in FIG. 8 are possible without departing from the scope of the claims described below.

At step 802 an outgoing call can be placed by a user using the communication device 116. Different users each having different user profiles associated with the communication device 116 can share the communication device 116. At step 804, the communication device 116 can identify the user placing the outgoing call and the corresponding user profile. For example, if the user is already logged-in to the communication device 116, the communication device 116 can identify the user and user profile associated with the logged-in user. As another example shown in step 806, the communication device 116 can compare the outgoing call to contact lists associated with the list of user profiles stored locally or stored on the media server 322. As an example, the communication device 116 can scan through the telephone numbers in each contact list of each user profile, to determine which telephone number matches the outgoing call. The communication device 116 can then proceed to inform the media server

322 to bill the appropriate separate account and/or to combine the billing into a single account statement.

At step 808, the communication device 116 can determine the call type, for example, a business call or a personal call. As one example, the communication device 116 can check a calendar or time schedule to determine if the call corresponds to a business call or conference call. The user profile can also establish times for billing business calls and personal calls. For example, calls between lunch hours can be associated with personal calls, and calls between 9-12 and 1-5 can be associated with business calls. As another example, the communication device 116 can compare the outgoing call to phone numbers stored in a business contact list or a personal contact list. The media server 322 can also inform the communication device 322 of account status information, such as minutes used, charges, voice mail and messages, and provide any suggestions. For example, the media server 322 can indicate a preferred account to use based on the time of day, type of call, or minutes used.

If the call type cannot be automatically determined then the media server 322 can query the user for same, or if the user decides to manually select the call type, the user can select the call type or select other information indicative of the call type, at step 810. Each call type is associated with a specific subscription and billing account according to information entered in the user profile. If at step 812, the call type corresponds to a business call, the communication device 116 can inform the media server 322 to charge the business subscriber account in the user profile as in step 814. If not, the method 800 can proceed to step 816. If at step 816, the call type corresponds to a personal call, the communication device 116 can inform the media server 322 to charge personal subscriber account in the user profile as in step 818. If not, the method 800 can proceed back to steps 808 and 810, wherein the communication device 116 proceeds to request the user to manually enter the call type.

In step 820, the media server 322 and/or the communication device 116 can itemize calls to separate accounts, such as for billing purposes. The communication device 116 can display or otherwise present (e.g., a voice message) service histories for the separate accounts. The media server 322 can also present account status to the user for the different accounts. For example, the media server 322 upon reviewing the minutes used and plan of the business account or personal account can keep track of the billing. A user interface can be provided that allows the user to see their service plan history and associated user profile. As one example, the media server 322 can selectively trade minutes between plans, for example, based on incurred charges or expected charges, or if one plan is exceeding minutes used in comparison to another plan. The media server 322 can also receive a directive from a user interface managed by a subscriber to adjust for incorrectly or accidentally charged accounts. As an example, the media server 322 can adjust a billing to the business account if the personal account was accidentally charged for a call. The service history, available to the user via a user interface, can reflect any updates or changes made automatically or manually to the subscriber account information.

Upon reviewing the aforementioned embodiments, it would be evident to an artisan with ordinary skill in the art that said embodiments can be modified, reduced, or enhanced without departing from the scope and spirit of the claims described below. For example, the media server 322 can communicate with a set-top box (STB) to present current subscription information responsive to a user request. The media server 322, such as through use of the STB can allow users to share and exchange contact information within user profiles. For instance, the STB can present a linked in network of contacts based on the user profiles from which to select and share. The STB, based on user permissions and allowances, can also establish policies for sharing the communication devices.

These are but a few examples of modifications that can be applied to the present disclosure without departing from the scope of the claims. Accordingly, the reader is directed to the claims section for a fuller understanding of the breadth and scope of the present disclosure.

Figure 9:
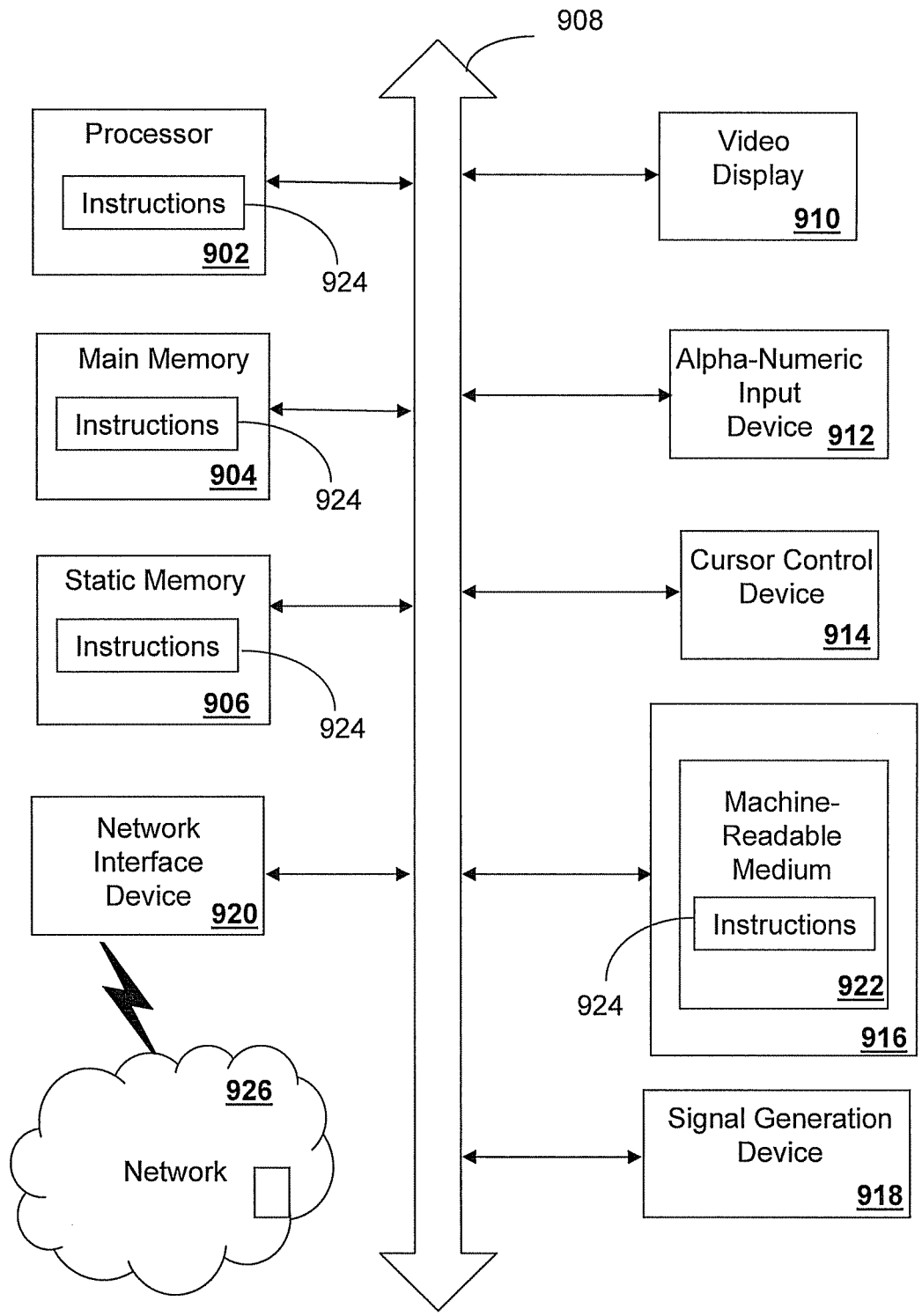
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a mass storage medium 916, a signal generation device 918 (e.g., a speaker or remote control) and a network interface device 920.

The mass storage medium 916 may include a computer-readable storage medium 922 on which is stored one or more sets of instructions (e.g., software 924) embodying any one or more of the methodologies or functions described herein, including those methods illustrated above. The computer-readable storage medium 922 can be an electromechanical medium such as a common disk drive, or a mass storage medium with no moving parts such as Flash or like non-volatile memories. The instructions 924 may also reside, completely or at least partially, within the main memory 904, the static memory 906, and/or within the processor 902 during execution thereof by the computer system 900. The main memory 904 and the processor 902 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the computer-readable storage medium 922 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media server, comprising a memory coupled to a controller, the controller operable to:
   store at least two user profiles associated with a shared communication device, each of the at least two user profiles including at least one of a phone number and an instant message identifier;
   activate an account associated with one user profile responsive to a selection of the one user profile from the at least two user profiles;
   provide services to the shared communication device in accordance with the one user profile;
   identify from an outgoing call from the shared communication device a caller placing the outgoing call and a corresponding user profile of the caller;
   determine a call type for the outgoing call based at least in part on the corresponding user profile;
   bill an account of the corresponding user profile associated with the call type;
   compare the outgoing call to a list of business contacts and personal contacts in the corresponding user profile; and
   determine whether the outgoing call is a business call or a personal call based on the comparing.

2. The media server of claim 1, wherein the controller is adapted to from the caller and call-type identify the account associated with the outgoing call.

3. The media server of claim 1, wherein the controller is adapted to, for an incoming call to the shared communication device, determine a callee and a call type from a list of user profiles, and receive from a presence server information for contacting the callee on the shared communication device.

4. The media server of claim 1, wherein the controller is adapted to transmit a notification to the shared communication device that identifies a callee and a call-type for activating the shared communication device according to a user profile of the callee for the call-type.

5. The media server of claim 1, wherein the controller is adapted to transmit a notification that informs the shared communication device to display a custom screen or audibly play a ring-tone according to a user profile of a callee for distinguishing the callee among a group of users.

6. The media server of claim 1, wherein the user profile identifies telephone numbers for a business contact list and telephone numbers for a personal contact list.

7. A method, comprising:
storing at least two user profiles associated with a communication device, each of the at least two user profiles including at least one of a phone number and an instant message identifier;
activating an account associated with one user profile responsive to a selection of the one user profile from the at least two user profiles;
providing services to the communication device in accordance with the one user profile;
identifying from an outgoing call from the communication device a user placing the outgoing call and a corresponding user profile of the user;
determining a call type for the outgoing call based at least in part on the corresponding user profile;
billing an account of the corresponding user profile associated with the call type;
comparing the outgoing call to a list of business contacts and personal contacts in the corresponding user profile; and
determining whether the outgoing call is a business call or a personal call based on the comparing.

8. The method of claim 7, comprising:
assigning multiple phone numbers to the communication device in accordance with the one user profile; and
billing accounts of the user profile separately for charges associated with use of the multiple phone numbers.

9. The method of claim 7, comprising:
storing the at least two user profiles on a media server; and
utilizing the media server to direct incoming calls to the communication device and direct outgoing calls from the communication device based on the at least two user profiles.

10. The method of claim 7, comprising:
authenticating the user based at least in part on one or more access codes or biometric identifiers associated with the user; and
activating services for the one user profile based on the authentication.

11. The method of claim 7, comprising:
displaying a custom screen or audibly playing a ring-tone according to the user profile of the user for distinguishing the user among a group of users and notifying the user of an incoming call directed to the user.

12. The method of claim 7, comprising:
itemizing calls for separate accounts; and
displaying service histories for the separate accounts on the communication device.

* * * * *